United States Patent Office 2,733,147
Patented Jan. 31, 1956

2,733,147

QUICK COOKING RICE AND PROCESS THEREFOR

Ataullah K. Ozai-Durrani, Stuttgart, Ark.

No Drawing. Application September 10, 1953,
Serial No. 379,457

32 Claims. (Cl. 99—80)

This invention relates to a method of preparing a quick cooking rice product and to the rice product itself. The present application is a continuation-in-part of copending applications Serial No. 629,864, filed November 20, 1945, and Serial No. 744,034, filed April 25, 1947, both now abandoned, and Serial Nos. 188,475 and 188,476, filed October 4, 1950.

A grain of rice, when harvested, includes an inner endosperm and germ which consists mainly of starch covered by a pericarp or bran layer which contains most of the oil, fats, vitamins, proteins and minerals, and a siliceous outer husk or hull. Rice with the hulls is called paddy or rough rice. In order to make it suitable for human consumption, at least the hulls must be removed from the grains. Rice kernels from which only the hulls have been removed by milling are known as brown rice. If brown rice is further milled to remove some or all of the pericarp or bran, white rice is obtained. Brown rice and white rice are classified together as milled rice. Before milling, of course, the rice can be parboiled to preserve some of the nutritional elements contained in the bran. Parboiled and unparboiled milled rice are usually prepared for consumption by boiling in excess water for 45 to 25 minutes, respectively, in order to obtain a product which is soft in texture and not rubbery.

It is an object of the invention to provide a quick cooking rice and a process for obtaining the same.

It is another object of the invention to treat rice so as to promote its penetration by boiling water and thereby reduce the time required for cooking the rice.

It has now been found that rice can be rendered quick cooking by subjecting whole rice grains, the external portions of which comprise moist, substantially completely gelatinized starch in a completely pliable condition and the internal portions of which comprise starch ranging from a very slight degree of gelatinization and pliability to complete gelatinization and pliability, to mechanical compression so that the structure of the grains is modified without reducing the grains to a flaked condition. After the step of mechanical compression the rice may be further processed to complete gelatinization and/or hydration if not previously done or it can be dried directly, as desired. The exterior portions of the rice grains must be in a completely pliable condition which is effected by moistening and gelatinizing the same. The interior portions of the rice grains can range from complete pliability to a condition of only slight pliability. If the interior portions are not at all gelatinized they have such a degree of brittleness and are so completely lacking in pliability that the process of the present invention may not be employed successfully. However, if the interiors of the rice grains are gelatinized to even a slight extent the desired degree of pliability can be provided. For example, rice which has been soaked to about 30% moisture and steamed to fully gelatinize the exterior portions and only slightly gelatinize the interior portions of the grains or rice which has been fully gelatinized, dried and then steamed briefly to moisten only the exterior portions of the grains has interior portions of sufficient pliability. Needless to say, fully gelatinized rice in which the exterior portions are fully pliable and the interior portions are of equal pliability, may be compressed in accordance with the present invention.

Specific examples of the manner in which the present invention may be employed are set forth below:

1. Ungelatinized, milled rice is soaked to increase its moisture content to a substantial degree, say, 17–36%, preferably 25–35%, and steamed to partially or completely gelatinize the rice and further increase its moisture content, say, by 1–8%, as a rule not to exceed 40%. The rice is compressed and then dried in any suitable manner.

2. Ungelatinized, milled rice is soaked to increase its moisture content to a substantial degree, say, 17–36%, preferably 25–35%, and steamed to completely gelatinize the rice and further increase its moisture content, say, by 1–8%, as a rule not to exceed 40%. The rice is mechanically compressed, placed in water to increase its moisture content to 60–70%. On the other hand, after steaming as above described, the rice may be placed in water to raise its moisture content to 60–70% as above and thereafter compressed. Preferably, the rice is contacted with the soaking water while still hot from the steaming since this provides the rice in an enlarged condition which greatly facilitates soaking. At a moisture content appreciably above 70% the advantages of compression are not as great as when the rice contains less moisture. The rice is then dried in any suitable manner, preferably at relatively high temperatures and air velocities.

3. Ungelatinized, milled rice is soaked to increase its moisture content to a substantial degree, say, 17–36%, preferably 25–35%, and steamed briefly to render only the surface portion of the grains pliable and gelatinized. The rice is compressed, steamed for an additional period to complete gelatinization throughout the rice grains and then dried in any suitable manner.

4. Dried, milled rice, either ungelatinized or parboiled or otherwise gelatinized, is placed in hot or boiling water to raise the moisture content to about 60–70%, and in the case of the former, effect gelatinization. The rice is compressed and thereafter dried, at relatively high temperatures and air velocities, for example at 325–350° F. and 200 ft./min. respectively.

5. Dried, milled, parboiled or otherwise gelatinized rice is contacted briefly with water to moisten the surface of the grains and then steamed for a short period, the moistening and steaming serving to increase the overall moisture content of the rice by 1–5%, the bulk of the moisture being concentrated at the surface of the grains. The rice is then mechanically compressed and dried in any suitable manner.

6. Dried, parboiled or otherwise gelatinized rice is steamed for a sufficient time to increase the overall moisture content of the rice to 17–25% and render the entire grain fully pliable. The rice is then mechanically compressed and dried in any suitable manner. In the case of rough rice, the compression step serves to crack and loosen the hulls which may be separated from the grains in any conventional manner.

7. Dried, milled, parboiled or otherwise gelatinized rice is placed in cold water for a period of time sufficient to raise its moisture to 30–70%, say, 30–60 minutes. The rice is then compressed and dried.

8. Ungelatinized, milled rice is soaked to increase its moisture content to a substantial degree, say, 30%, steamed to substantially fully gelatinize the grains throughout and increase its moisture content to about 35%. The rice is then dried in any conventional manner to 17–25%, compressed and dried. It is preferred that a tempering step be employed after the drying step so that the moisture distribution within the grains may be uniform and the moisture of the exterior portions be thereby increased so that said portions will have greater pliability.

In carrying out the practice of the invention, paddy or rough rice as well as milled rice such as brown rice and white rice may be employed, but ordinarily white rice is preferred. In the event paddy is used, especially if parboiled paddy is employed, the steps of milling to remove the hulls and compressing to effect the changes with which the present invention is concerned may be combined as described more fully hereinafter.

In those cases where it is desired to soak the rice, e. g., prior to a subsequent steaming or cooking step, the soaking is generally carried out at a temperature below that at which the starch becomes gelatinized (e. g. 150° F.). Generally at room temperature it requires about 30 minutes to raise the moisture content of the grains to about 30%. Higher moisture contents may be imparted to the rice by the use of longer periods of time and/or higher temperatures of soaking, particularly the latter.

After the brief soaking periods, e. g., 30 minutes, generally employed with ungelatinized, milled rice, such as used in the first three of the above examples, the moisture distribution within the grains is by no means uniform, that contained in the exterior portions of the grains being higher than that contained in the interior portions. On heating the rice, as by using steam, partial or complete gelatinization may be effected depending upon duration of such treatment. With relatively short periods of heating, only the exterior portions of the rice grains are gelatinized while the interior portions of the grains remain substantially ungelatinized. With relatively long periods of heating, substantially complete gelatinization of the entire grains may be effected. In the former case only the exterior portion of the grains are entirely pliable with the interior portions of the grains having a considerably lesser degree of pliability approaching brittleness. In the latter case the grains are substantially completely pliable throughout.

When the surfaces of parboiled rice grains are moistened and then the grains are steamed for a short period of time to increase the overall moisture content of the rice by 1–5%, as in the fifth example above, the interior portions of the grains are of a much lower degree of pliability than the exterior portions which are completely moist and gelatinized and, of course, completely pliable. This is likewise the case in the seventh example above where gelatinized, dried rice is soaked to 30–70% moisture.

In those cases where the rice, either ungelatinized or parboiled, has been placed in hot or boiling water to raise the moisture content to about 60–70%, and in the case of the former, to effect gelatinization, as in the fourth example above, the rice is substantially completely pliable throughout. Similarly, in the case of parboiled or previously gelatinized and dried rice which is steamed for a sufficiently long time to increase its overall moisture content to 17–25%, as in the sixth example above, the grains are of substantially equal pliability throughout. In the case of rice which has been soaked and steamed to fully gelatinize and partially hydrate the grains and is thereafter dried to an appreciable extent as in the eight example given above, the exterior portions of the grains being less moist than the interior could in many cases be less pliable than the interior portions of the grains. There is, however, adequate pliability in the outer portions of the grains to prevent disintegration and, of course, there is no objection per se to having interior portions of greater pliability than the exterior portions of the grains. However, it is preferred to have the exterior portions as pliable as conditions permit and hence tempering is best employed after drying as stated above.

Of the various embodiments described above, it is preferred to employ that in which ungelatinized milled white rice, the ordinary rice of commerce, is soaked in water at a temperature below the gelatinization temperature to increase its moisture content to within the range of about 17% to 36%, preferably 25–35%, and is then steamed to render the exterior portions of the grains completely pliable and the interior portions somewhat pliable although less so than the exterior, the increase in the moisture content of the rice being 1–8% but not exceeding about 40%. In such cases the amount of steaming required varies somewhat inversely with the moisture content of the rice grains that is provided by soaking. At the lower moisture contents of the order of 17%, 30 minutes of steaming may be required with some rice varieties while at moisture contents of the order of 36% steaming for as little as 3 minutes may suffice. It has been shown by microscopic examination of rice grain sections that such treatment results in the outer portions of the grains containing no birefringent material while the inner portions of the grains contain an appreciable amount of such material. This indicates that the exterior portions are completely gelatinized and that the interior portions although gelatinized still contain an appreciable amount of ungelatinized starch. Compressing the rice using spaced rolls gives excellent results in terms of the quality and character of the product, it being believed that this is in large measure accounted for by the difference in pliability between the interior and exterior portions of the grains. Similar differences in pliability exist where previously gelatinized rice is steamed briefly as in the fifth example above and a similarly preferred product is provided.

Another preferred embodiment is that described in detail in Example VI below in which the soaked, white rice is steamed for 10–15 minutes until the grains are completely gelatinized.

After preparation such as that detailed above, the rice is ready for subjection to mechanical compression for modification of its structure as mentioned above. Preferably, this compression is effected by passing the rice grains through compression rolls set such a distance apart as to provide a reduction of thickness of the grains without compressing them into flakes. The rolls can be of any desired diameter, rolls of small diameter producing a final product having a curl and rolls of larger diameter producing a relatively flat product. If desired, the rolls can also be run at different peripheral speeds in order to increase the amount of distortion and the curl of the grains. In some cases, however, it is not possible to employ rolls in the ordinary conventional manner to effect the compression with which the present invention is concerned without unduly disintegrating the rice grains. In such cases, a press may be employed, however, with entirely satisfactory results as regards the quality and quick-cooking characteristics of the product. Such cases usually include rice which has been cooked or otherwise processed so that its moisture content is relatively high, e. g., 65%. On the other hand, rolls can be used in such cases if the rice grains are transferred to and through the rolls by means of a stream of water. In order to facilitate the handling of the grains in passing them to or through the rolls or other compressing equipment they may be subjected to a blast of air, preferably cold air, or they may be briefly contacted with cold water in order to toughen their surfaces.

The extent by which the thickness of the grains should be reduced depends in part on the amount of gelatinization of the grains during the preceding cooking operation and in part on the desired softness or texture of the rice when subsequently cooked for consumption. In general, it will be found that the greater the degree of compression, the softer the texture of the rehydrated product for given conditions of precooking and final cooking (i. e. the rehydration carried out by the consumer). Also, grains which have been gelatinized to a lesser degree by precooking require greater compression in order to obtain the same degree of softness in the rehydrated product. For rice soaked and precooked according to the conditions described above, it has been found that the thickness of the grains should be reduced to from about 30% to about 80% of their thickness before compression in order to provide a rehydrated product having the texture and other characteristics of regularly cooked rice.

Such compression modifies the rice grains in a way which is not wholly understood to make the same quick cooking. It has been observed, however, that the compression results in the formation of cracks and fissures within the grains extending from the surfaces of the grains into their interior portions. It is believed that this permits the water to penetrate into the grains more quickly on subsequent cooking. However, it is not believed that this is more than a partial explanation. It has also been observed that generally the compressed grains exhibit one or more longitudinally disposed central veins or cracks and a plurality of laterally disposed cracks. Also, it is believed that while the completely pliable exterior portions are distorted by the compression the modification of the rice grain structure upon which the present invention depends occurs for the most part within the interior portions of the rice grains.

After compression the rice grains are dried to a stable moisture content for packaging, storage, and/or commercial distribution, usually in the range of 10% to 14%. Any suitable drying method can be employed, but circulation of heated air through a bed of the rice is preferred because of its high efficiency. The rice may be dried at any desired temperature below that at which discoloration or toasting of the grains occurs. For most rice varieties at the moisture contents specified above, the maximum temperature is about 375°–400° F. At lower drying temperatures, say 150°–200° F. the rice grains may shrink somewhat during drying. In those cases where the moisture content of the rice is relatively high, say 55–70% it is preferred to employ the relatively high temperatures and air velocities set forth in U. S. Patent No. 2,438,939, i. e., 280° F. and 200 ft./min. This serves to minimize the shrinkage which might otherwise occur during drying. On the other hand, in the case of rice of relatively low moisture content, say, 17–40%, it is preferred to use even higher temperatures of drying, say, about 325°–350° F. since this produces some slight enlargement which is desirable from the standpoint of controlling the density of the product.

In applying the process described above to rough rice, it is necessary to remove the hulls from the rice grains. As described in my co-pending application, Serial No. 188,476 mentioned above, the hulls are preferably removed while the grains are in a moist pliable condition by passing them between rolls which are set at a distance such that the hulls are loosened and cracked, broken or rubbed off. This hulling operation can be conveniently performed immediately following the steaming or cooking step with the rice at an overall moisture content in the range of 17 to 40%. The loose hulls are separated from the grains in any conventional manner as by placing them on a conveyor and passing them under aspirators. Since loosening the hulls involves the use of relatively light compression between rolls, it may, if desired, be performed simultaneously with the compression of the grain as described above.

Rice prepared in accordance with the present invention is, as aforementioned, a quick cooking product, capable of being cooked to soft textured, fluffy whole grains by simply placing the dry grains in water, bringing the water to a boil, discontinuing heating and allowing the water and rice to stand in a covered vessel or pan for about 10 minutes.

Detailed examples of the manner in which the process of the present invention may be employed to provide the quick cooking rice product follow:

*Example I*

100 pounds of ungelatinized white rice with a moisture content of about 12% are placed in a 100 gallon vessel or tank together with about 60 gallons of water and allowed to soak for 30 minutes at room temperature (75° F.). Thereafter the rice is transferred from the tank to a screen and allowed to drain for 15 minutes. At this point the rice contains about 30% of moisture. Satisfactory results are obtained in accordance with this embodiment of the invention if the conditions of soaking are varied so that the moisture content may range from about 17% to about 36%, preferable results are obtained at 25–35%. Then the rice is transferred to an 80 gallon autoclave and treated with dry steam at 8 pounds gauge pressure for 5 minutes at the end of which time the outer portions of the rice grains are substantially completely gelatinized containing no birefringent material and the inner portions while somewhat gelatinized still contain an appreciable amount of ungelatinized starch granules or birefringent material. The overall moisture content of the grains after steaming is about 34%. Generally, rice prepared in this manner may have a moisture content of about 17–40% and be suitable for compression. The rice grains are then removed from the cooker and transferred to a conveyor belt, being spread out thereon in a layer about one grain thick. The grains are thus conveyed to and passed between smooth rolls set to reduce the thickness of the grain to about 50% of their thickness before compression. After passing through the rolls the rice is dried in any conventional manner to a stable moisture content of 10 to 14%. A convenient and rapid way of effecting drying is to employ a forced draft, hot air drier using air at 325°–350° F., the drying being effected in 5–10 minutes. The product has a density of 0.70 g./cc. It is then packaged and distributed in the usual commercial manner.

*Example II*

100 pounds of ungelatinized white rice with a moisture content of about 12% is placed in a 100 gallon vessel or tank together with about 60 gallons of water and allowed to soak for 30 minutes at room temperature (75° F.). Thereafter, it is transferred from the tank to another tank containing boiling water and boiled for about 10 minutes to fully gelatinize and hydrate the grains raising their moisture content to 65%. The rice is then cooled and transferred to a horizontally moving screen from the end of which it falls onto one of a pair of smooth compression rolls spaced apart sufficiently to compress the grains to about 70% of their thickness before compression. In order to facilitate handling at this point a stream of cold water is played onto the same roll onto which the rice grains are deposited so that at the time of compression the grains are in effect slurried in water. This prevents the grains from sticking to the rolls so that disintegration is prevented or at least minimized. From the rolls the compressed rice grains and the water fall onto a horizontally moving screen. The rice grains are drained in the first few feet of their travel on the conveyor. Thereafter, hot air at a temperature of about 285° F. is blown upwardly through the bed of rice grains at an air velocity of about 200 feet per minute. If desired, at a subsequent point in the screen's travels the hot air may be passed downwardly through the bed of rice grains. In this manner, the relatively enlarged size of the grains resulting from the complete gelatinization and hydration of the rice is preserved to a great degree and the rice is reduced to a stable moisture content of 10–14%, the final product having a density of 0.25–0.45 g./cc.

*Example III*

100 pounds of milled, parboiled or otherwise gelatinized, dried, white rice with a moisture content of about 12% are placed in an 80 gallon autoclave and steamed at 8 lbs./sq. in. (gauge) for 8–10 minutes to raise the moisture content thereof to 22% and render said grains completely pliable throughout. Thereafter, said grains are compressed by passing the same through rolls, spaced so as to reduce the grains to about 60% of their thickness before compression, and the rice is dried to a stable moisture content of 10–14% in the manner described in detail in Example I above, the final product having a density of 0.70–0.75 g./cc.

*Example IV*

100 pounds of milled, parboiled or otherwise gelatinized, dried rice with a moisture content of about 12% are placed in about 60 gallons of water contained in a 100 gallon tank at room temperature (75° F.) and allowed to soak in the water for two minutes. The soaked rice is then removed from the water, drained for a half minute and placed in an 80 gallon autoclave and steamed at 8 lbs./sq. in. (gauge) for 1–2 minutes to render the surface portion of the grains pliable and increase the overall moisture content of the grains by about 5%, the interior portions of the grains remaining substantially unchanged. Thereafter, said grains are compressed by passing the same through rolls, spaced so as to reduce the grains to about 80% of their thickness before compression, and dried to a stable moisture content of 10–14% in the manner described in detail in Example I above.

*Example V*

100 pounds of milled, parboiled, or otherwise gelatinized, dried, white rice with a moisture content of about 12% are placed in about 60 gallons of water in a 100 gallon tank and allowed to remain therein for about one hour at room temperature (75° F.) and raise the moisture content of the rice to 50%. The rice is then drained for 15 minutes. Thereafter said grains are compressed by passing the same through rolls, spaced so as to reduce the grains to about 80% of their thickness before compression, and dried to a stable moisture content of 10–14% in the manner described in detail in Example I above. The density of this product is 0.65–0.75 g./cc.

*Example VI*

100 pounds of ungelatinized rice with a moisture content of 12% is placed in a 100 gallon tank together with 60 gallons of water and soaked for 30 minutes at room temperature (75° F.). Thereafter it is transferred from the tank to a screen and allowed to drain for 15 minutes. At this point the rice contains 30% moisture. The rice is transferred to an 80 gallon autoclave and treated with steam at 8 lbs./sq. in. for 10 minutes and completely gelatinized. Thereafter the rice is returned to the soaking tank and allowed to soak in the water for an additional period of 20 minutes which serves to increase the moisture content of the rice to about 65%. The rice is then removed from the soaking water, drained for 15 minutes, blasted with cold air to toughen the surfaces of the grains, and then subjected to mechanical compression by passing the same through rolls spaced so as to reduce the grains to about 70% of their thickness before compression and dried to a stable moisture content of 10–14% as described in detail in Example II above. The density of this product is 0.4 g./cc.

If desired, the rice may be soaked and steamed to fully gelatinize the same as above, compressed and then contacted with water to fully hydrate the same to 60–70% moisture and then dried.

Also, the rice may simply be soaked, steamed to fully gelatinize the same as above, and then compressed and dried.

*Example VII*

100 pounds of ungelatinized white rice with a moisture content of about 12% is placed in a 100 gallon vessel or tank together with about 60 gallons of water and allowed to soak for 30 minutes at room temperature (75° F.). Thereafter the rice is transferred from the tank to a screen and allowed to drain for 15 minutes. At this point the rice contains about 30% of moisture. The rice is then transferred to an 80 gallon autoclave and steamed at 8 lbs./sq. in. (gauge) for 5 minutes at the end of which time the outer portions of the rice grains are completely gelatinized and the inner portions while somewhat gelatinized still contain an appreciable amount of ungelatinized starch granules. The rice grains are then compressed by passing the same through rolls spaced so as to reduce the grains to about 70% of their thickness before compression as described in detail in Examples I and II above. The rice is then returned to the 80 gallon autoclave and steamed for an additional 5–10 minutes to render the same completely gelatinized throughout, after which it is removed from the autoclave and dried to a stable moisture content of about 10–14%, using the drying condition described in Example I. The density of this product is 0.50–0.70 g./cc.

It will be evident that at any appropriate stage in the process the rice grains can be washed with water or solvent extracted to decrease their fat content and thereby decrease any problem of rancidification that might exist. Also, any suitable antioxidant can be added if desired. One very effective method of eliminating any possibility of a rancidity problem is to soak the rice in hot water, say, at 175°–180° F. for 5–10 minutes. This may be employed at any stage of the process, but it is preferred that it follows the preliminary soaking step which is employed in many of the embodiments of the invention described above.

It will be understood that the details set forth above are by way of example only and that various procedural modifications within the spirit of the invention will occur to those skilled in the art. Accordingly, reference should be had to the appended claims for a definition of the limits of the present invention.

While the steaming employed in the present invention may be carried out in any conventional manner, it is preferred that those techiques and apparatus be employed which will gelatinize the rice grains as quickly as possible since this provides the most suitable product.

What is claimed is:

1. A process for preparing quick cooking rice which comprises subjecting whole rice grains having exterior portions of moist, substantially completely gelatinized starch in a completely pliable condition and interior portions ranging from partially gelatinized starch having at least a degree of pliability to substantially completely gelatinized starch in a completely pliable condition to mechanical compression to distort and modify the structures of the grains, said compression being limited to avoid reducing the grains to a flaked condition.

2. The process defined in claim 1, said grains being compressed to reduce the thickness of the grain to from 30% to 80% of its thickness before compression.

3. The process defined in claim 2 in which the compressed grains are dried to a stable moisture content.

4. A process for preparing quick cooking rice which comprises moistening the surface portions of gelatinized, dried rice grains and heating the same to produce completely pliable exterior portions surrounding only slightly pliable interior portions and subjecting said grains to mechanical compression to distort the grains and cause the production of cracks and fissures extending from the surfaces of the grains into the interior portions thereof, said compression being limited to avoid reducing the grains to a flaked condition.

5. The process defined in claim 4 in which said grains are compressed to reduce their thickness to from 30% to 80% of their thickness before compression.

6. The process defined in claim 5, including the step of drying the compressed grains to a stable moisture content.

7. The process defined in claim 6, in which the grains are remoistened by the addition of about 1–5% moisture, said moisture being confined to the exterior portions of the grains.

8. A process for preparing quick cooking rice which comprising soaking ungelatinized rice grains below the gelatinization temperature of the same, heating the soaked grains to gelatinize substantially completely the exterior portions of the grains without effecting more than partial gelatinization of the interior portions of the grains, thereby producing grains having moist pliable exterior portions enclosing less pliable interior portions and then subjecting the grains to mechanical compression to distort the grains and cause the production of cracks and fissures extending from the surfaces of the grains into the interior portions thereof, said compression being limited to avoid reducing the grains to a flaked condition.

9. The process defined in claim 8 in which said grains are compressed to reduce their thickness to from 30% to 80% of their thickness before compression.

10. The process defined in claim 9 in which the compressed grains are dried to a stable moisture content.

11. The process defined in claim 10, the moisture content of the rice grains being within the range of 17–36% after soaking, the time of heating varying inversely with the moisture content of the grains, and the moisture content of the grains at the time of compression being within the range of 17–40%.

12. The process defined in claim 8 in which rough rice is soaked and steamed and the hulls are loosened from the grains during said mechanical compression and thereafter separated from the grains.

13. The process defined in claim 12, said grains being compressed to from 30% to 80% of their thickness.

14. The process defined in claim 13 in which the compressed rice grains are dried to a suitable moisture content.

15. The process defined in claim 14, said rice grains being soaked to raise the moisture content to the range of 17–36%, steamed for a time varying inversely with the moisture content of the grains and thereafter compressed, the moisture content of the grains at the time of compression being within the range of 17–40%.

16. A process for preparing quick cooking rice which comprises soaking rice grains below the gelatinization temperature of the starch, steaming the rice grains until the interior portions of the grains are substantially gelatinized but still contain birefringent material, the outer portions of the grains being gelatinized to a point at which they contain substantially no birefringent material, thereby producing grains having moist pliable exterior portions enclosing less pliable interior portions, then subjecting the grains to mechanical compression to distort and modify the structures of the grains with the production of cracks and fissures throughout the grains, said compression being limited to avoid reducing the grains to a flaked condition, whereby on subsequent cooking of the grains water penetrates into the interiors of the grains through said cracks and fissures to cause rapid rehydration and swelling thereof to the condition of cooked soft-textured whole rice grains, and drying the grains to a stable moisture content.

17. A process for preparing quick cooking rice which comprises soaking milled rice grains in water at about room temperature for about 30 minutes to increase the moisture content thereof to about 30%, then steaming the soaked rice for a period of time sufficient to increase its moisture content to about 34% and to gelatinize substantially the outer portions of the grains without effecting more than partial gelatinization of the inner portions of the grains, thereby producing grains having moist pliable exterior portions enclosing less pliable interior portions, cooling said grains to toughen the surface thereof, subjecting said grains to mechanical compression to reduce the grains to from 30% to 80% of their thickness before compression and modify the internal structure thereof without reducing them to a flaked condition, the pliable exterior portions maintaining the grains integral while permitting the formation of cracks and fissures which facilitate penetration of water into the grains on subsequent cooking thereof, and drying the grains to from about 10% to 14% moisture content.

18. A process for preparing quick cooking rice which comprises subjecting substantially completely gelatinized and hydrated whole rice grains to mechanical compression to distort and modify the structures of the grains, said compression being limited to avoid reducing the grains to a flaked condition and then drying the grains at non-toasting temperatures to a stable moisture content.

19. The process defined in claim 18 in which said grains contain about 67–70% moisture and are compressed to reduce their thickness to from 30% to 80% of their thickness before compression.

20. The process defined in claim 19 in which the compressed grains are dried to 10–14% moisture.

21. A process for preparing quick cooking rice which comprises steaming previously gelatinized and dried rice for a sufficient period of time to render the grains substantially completely pliable throughout and subjecting said grains to mechanical compression limited to avoid reducing the grains to a flaked condition.

22. The process defined in claim 21 in which the steaming is continued to increase the moisture content of the rice grains to within the range of about 17–25%.

23. The process defined in claim 21 in which the compressed grains are dried to a stable moisture content.

24. The process defined in claim 23 in which said grains are compressed to reduce their thickness to from 30% to 80% of their thickness before compression.

25. A process for preparing quick cooking rice which comprises soaking previously gelatinized, dried rice grains in water for a period of time sufficient to raise the moisture content of the grains to within the range of about 30–70%, and subjecting said grains to mechanical compression limited to avoid reducing the grains to a flaked condition.

26. The process defined in claim 25 in which the compressed grains are dried to a stable moisture content.

27. The process defined in claim 26 in which said grains are compressed to reduce their thickness to from 30% to 80% of their thickness before compression.

28. A process for preparing quick cooking rice which comprises soaking milled, ungelatinized rice grains in water at about room temperature for about 30 minutes to increase the moisture content thereof to about 30%, steaming the soaked rice to gelatinize substantially the exterior portions of the grains without effecting more than partial gelatinization of the interior portions of the grains, thereby producing grains having moist pliable exterior portions enclosing less pliable interior portions, soaking said grains in water to increase the moisture content to about 60–70%, cooling said grains to toughen the surface thereof, subjecting said grains to mechanical compression to reduce said grains to from 30% to 80% of their thickness before compression and modify the internal structure thereof without reducing them to a flaked condition, the pliable exterior portions maintaining the grains integral while permitting the formation of cracks and fissures which facilitate penetration of water into the grains on subsequent cooking thereof, and drying the grains to from about 10% to 14% moisture content.

29. A process for preparing quick cooking rice which comprises soaking milled, ungelatinized rice grains in water at about room temperature for about 30 minutes to increase the moisture content thereof to about 30%, then steaming the soaked rice to gelatinize substantially the outer portions of the grains without effecting more than partial gelatinization of the inner portions of the grains, thereby producing grains having moist pliable exterior portions enclosing less pliable interior portions, cooling said grains to toughen the surface thereof, subjecting said grains to mechanical compression to reduce said grains to from 30% to 80% of their thickness before compression and modify the internal structure thereof without reducing them to a flaked condition, the pliable exterior portions maintaining the grains integral while permitting the formation of cracks and fissures which facilitate penetration of water into the grains on subsequent cooking thereof, steaming to render the grains completely gelatinized throughout and drying the grains to about 10–14% moisture content.

30. Quick cooking rice in the form of compressed whole grains of dry substantially pre-gelatinized starch characterized by a plurality of cracks and fissures extending from the surface into the interior of the grains through which water can penetrate to the central portions thereof when the grains are rehydrated to provide cooked rice, said dry grains having been prepared by the process defined in claim 1.

31. A process for preparing quick-cooking rice which comprises soaking milled, ungelatinized rice grains in water at about room temperature for about 30 minutes to increase the moisture content thereof to about 30%, steaming the soaked rice to thoroughly gelatinize the grains, soaking said grains in water to increase the moisture content to about 60–70%, subjecting said grains to mechanical compression to reduce said grains to from 30% to 80% of their thickness before compression and modify the internal structure thereof without reducing them to a flaked condition, the complete pliability of the grains maintaining the grains integral while permitting the formation of cracks and fissures which facilitate penetration of water into the grains on subsequent cooking thereof, and drying the grains to from about 10% to 14% moisture content.

32. A process for preparing quick-cooking rice which comprises soaking milled, ungelatinized rice grains in water at about room temperature for about 30 minutes to increase the moisture content thereof to about 30%, steaming the rice to thoroughly gelatinize the grains, cooling said grains to toughen the surfaces thereof, subjecting said grains to mechanical compression to reduce said grains to from 30% to 80% of their thickness before compression and modify the internal structure thereof without reducing them to a flaked condition, the complete pliability of the grains maintaining the grains integral while permitting the formation of cracks and fissures which facilitate penetration of water into the grains on subsequent cooking thereof, and drying the grains to from about 10% to 14% moisture content.

References Cited in the file of this patent

UNITED STATES PATENTS

| | | |
|---|---|---|
| 1,832,813 | Luke | Nov. 17, 1931 |
| 1,925,267 | McKay | Sept. 5, 1933 |
| 2,295,116 | Kellogg | Sept. 8, 1942 |
| 2,438,939 | Ozai-Durrani | Apr. 6, 1948 |

FOREIGN PATENTS

| | | |
|---|---|---|
| 579,981 | Great Britain | Aug. 22, 1946 |